US009798366B2

(12) United States Patent
Ho et al.

(10) Patent No.: US 9,798,366 B2
(45) Date of Patent: Oct. 24, 2017

(54) HEAT DISSIPATION SYSTEM AND ELECTRONIC DEVICE USING THE SYSTEM

(71) Applicant: Wistron Corporation, New Taipei (TW)

(72) Inventors: Mang-Chia Ho, New Taipei (TW); Chi-Hsiang Yeh, New Taipei (TW); Jia-Cyuan Fan, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 15/138,893

(22) Filed: Apr. 26, 2016

(65) Prior Publication Data
US 2017/0115707 A1 Apr. 27, 2017

(30) Foreign Application Priority Data

Oct. 27, 2015 (TW) .............................. 104135306 A

(51) Int. Cl.
*G06F 1/20* (2006.01)
(52) U.S. Cl.
CPC .............. *G06F 1/206* (2013.01); *G06F 1/203* (2013.01)
(58) Field of Classification Search
CPC .................................. G06F 1/206; G06F 1/203
USPC .................................................... 361/679.47
See application file for complete search history.

(56) References Cited

U.S. PATENT DOCUMENTS

| 8,390,998 | B2* | 3/2013 | Kliewer | G06F 1/20 361/679.46 |
| 2004/0252282 | A1* | 12/2004 | Hsu | G03B 21/16 353/61 |
| 2005/0036287 | A2 | 2/2005 | Kosugi | |
| 2012/0298341 | A1* | 11/2012 | Fernandez | H05K 7/206 165/121 |
| 2013/0035784 | A1* | 2/2013 | Wernersbach | B61L 27/04 700/230 |
| 2013/0170139 | A1* | 7/2013 | Dunn | G02F 1/133385 361/695 |

(Continued)

FOREIGN PATENT DOCUMENTS

| CN | 1520252 A | 8/2004 |
| CN | 104735963 A | 6/2015 |
| TW | 575200 U | 2/2004 |

*Primary Examiner* — Dion R Ferguson
*Assistant Examiner* — Mandeep S Buttar
(74) *Attorney, Agent, or Firm* — Muncy, Geissler, Olds & Lowe, P.C.

(57) ABSTRACT

A heat dissipation system and an electronic device using the heat dissipation system are disclosed. The electronic device comprises a device main body including a circuit board. The heat dissipation system comprises a heat dissipation body, a control unit and a movable fan. The heat dissipation body is disposed near the circuit board. A plurality of first thermal sensors is distributed in various areas of the heat dissipation body and is used for monitoring a working temperature of each area. The control unit is electrically coupled with each thermal sensor. The movable fan is movably disposed at the heat dissipation body and is electrically coupled with the control unit to receive a signal, thereby allowing the control unit to control the movable fan to move to an area of the heat dissipation body having a higher working temperature than those of the other areas.

22 Claims, 11 Drawing Sheets

(56) References Cited

U.S. PATENT DOCUMENTS

2014/0111939 A1\* 4/2014 Lin .................... H05K 7/20172
                                                    361/695
2017/0042062 A1\* 2/2017 Guo ........................ H05K 7/20

\* cited by examiner

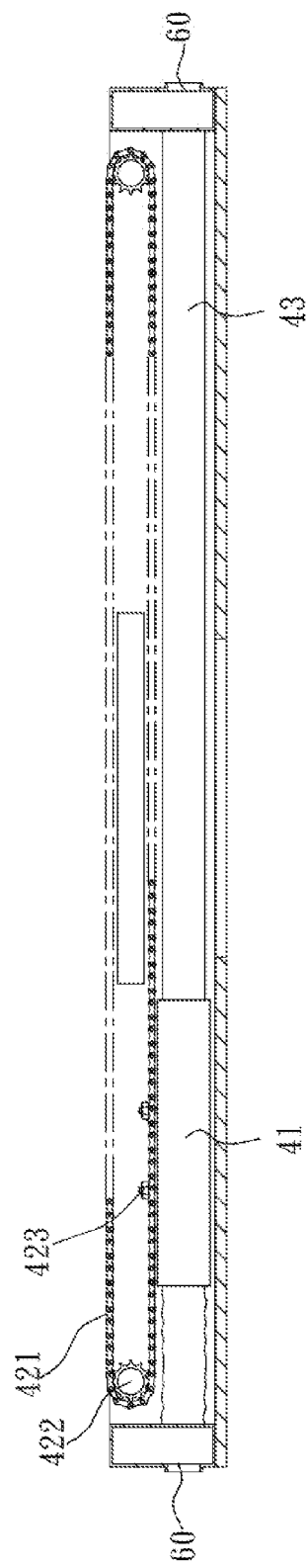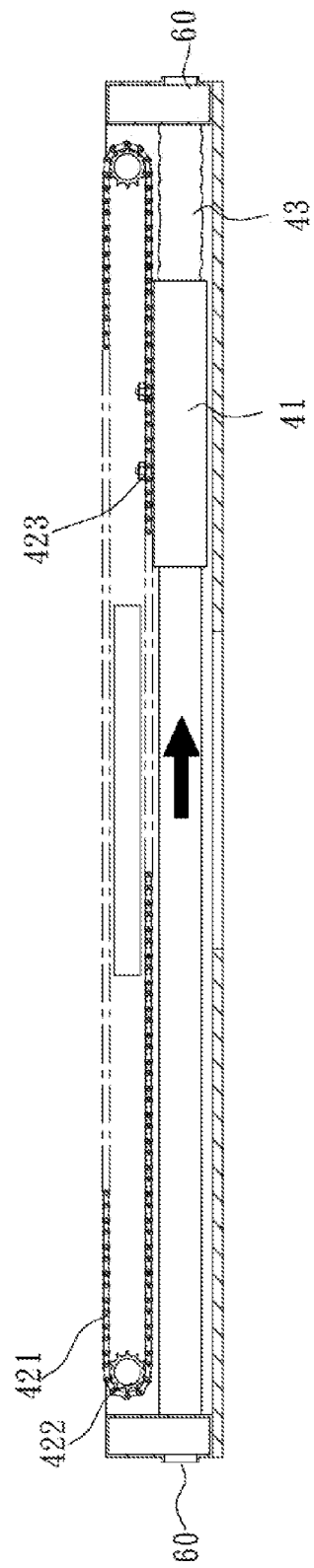
FIG. 3
FIG. 4

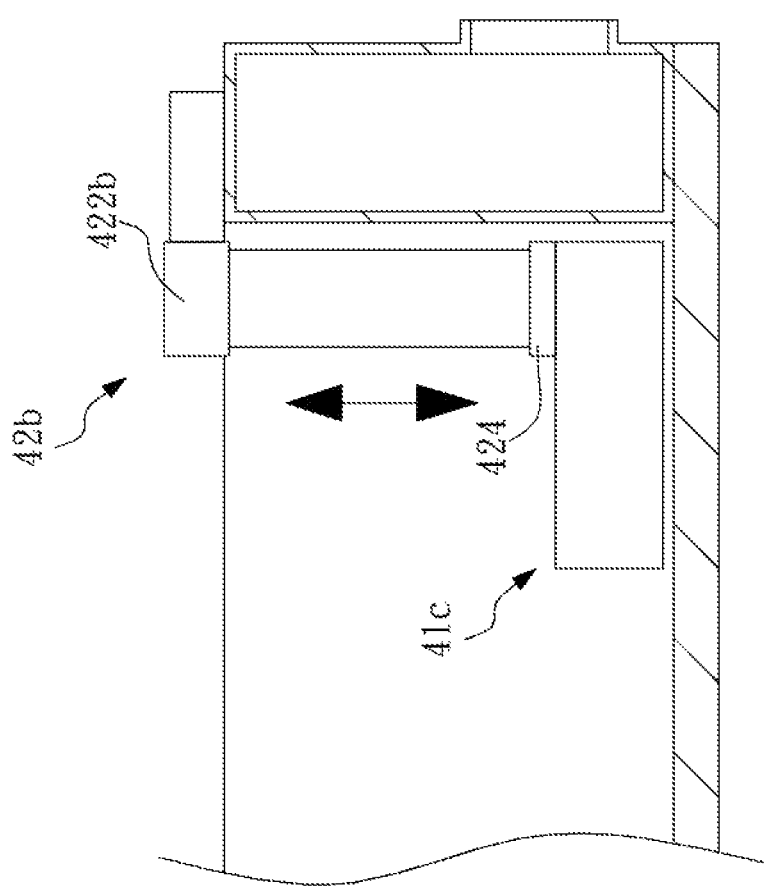

HEAT DISSIPATION SYSTEM AND ELECTRONIC DEVICE USING THE SYSTEM

BACKGROUND OF THE INVENTION

1. Field of the Invention

The present invention relates to a heat dissipation system and an electronic device using the heat dissipation system, and more particularly, to a heat dissipation system which comprises a heat dissipation body disposed near a circuit board of the heat dissipation system.

2. Description of the Related Art

Generally there are heat dissipation devices of internal type and external type, the internal heat dissipation device is often provided for dissipating heat generated by specific heat generating element (such as central processing unit, CPU) inside the electronic device, the external heat dissipation device is provided under the base of the electronic device (such as the system case of notebook PC). However, as most heat generating elements are placed under the keyboard module, the external heat dissipation device is disposed not closer enough to those heat generating elements and cannot dissipate heat efficiently. When a user has operated the electronic device for a long period, he/she can feel the heat radiated from the heat generating elements under the keyboard module and might have bad feelings about this. Meanwhile, inefficient heat dissipation environment can somewhat affect the operating efficiency of the electronic device. Therefore, it is necessary to propose improved heat dissipation solutions.

SUMMARY OF THE INVENTION

It is an object of the present invention to provide a heat dissipation system which comprises a heat dissipation body disposed near a circuit board of the heat dissipation system.

It is another object of the present invention to provide an electronic device using a heat dissipation system which comprises a heat dissipation body disposed near a circuit board of the heat dissipation system.

In order to achieve the above object, the present invention provides a heat dissipation system used in an electronic device, wherein the electronic device comprises a device main body including a circuit board. The heat dissipation system comprises a heat dissipation body, a plurality of first thermal sensors, a control unit, and at least one movable fan. The heat dissipation body is disposed near the circuit board. The plurality of first thermal sensors is distributed in various areas of the heat dissipation body and used for monitoring a working temperature of each area. The control unit is electrically coupled with each thermal sensor and configured to receive and transmit signals with each one of the plurality of first thermal sensors. The at least one movable fan is movably disposed on the heat dissipation body and electrically coupled with the control unit, thereby allowing the control unit to control the movable fan to move to an area of the heat dissipation body having a higher working temperature than those of the other areas.

The present invention further provides an electronic device comprising a device main body and a heat dissipation system, the device main body includes a circuit board. The heat dissipation system comprises a heat dissipation body, a plurality of first thermal sensors, a control unit, and at least one movable fan. The heat dissipation body is disposed near the circuit board. The plurality of first thermal sensors is distributed in various areas of the heat dissipation body and used for monitoring a working temperature of each area. The control unit is electrically coupled with each one of the plurality of first thermal sensors. The at least one movable fan is movably disposed on the heat dissipation body and electrically coupled with the control unit, thereby allowing the control unit to control the movable fan to move to an area of the heat dissipation body having a higher working temperature than those of the other areas.

Therefore, the present invention disposes the heat dissipation body near the circuit board of the electronic device. By doing so, the placement of the heat dissipation system of the present invention is disposed substantially closer to the heat generating element of the circuit board while compared to that of the prior art heat dissipation element (such as external heat dissipation device). Therefore, the present invention not only can improve the heat dissipation efficiency of the electronic device but also prevent inconvenience caused by overheated electronic device.

BRIEF DESCRIPTION OF THE DRAWINGS

FIG. 3 illustrates a view of the first embodiment of the moving element of the heat dissipation system of the present invention;

FIG. 4 illustrates a second view of the first embodiment of the moving element of the heat dissipation system of the present invention;

FIG. 13 illustrates a view of the fourth embodiment of the moving element of the heat dissipation system of the present invention.

DETAILED DESCRIPTION OF THE PREFERRED EMBODIMENT

The advantages and innovative features of the invention will become more apparent from the following detailed description when taken in conjunction with the accompanying drawings. Please refer to both FIG. 1 and FIG. 2 for views of a first embodiment of the heat dissipation system and the electronic device of the present invention.

Figure 1:
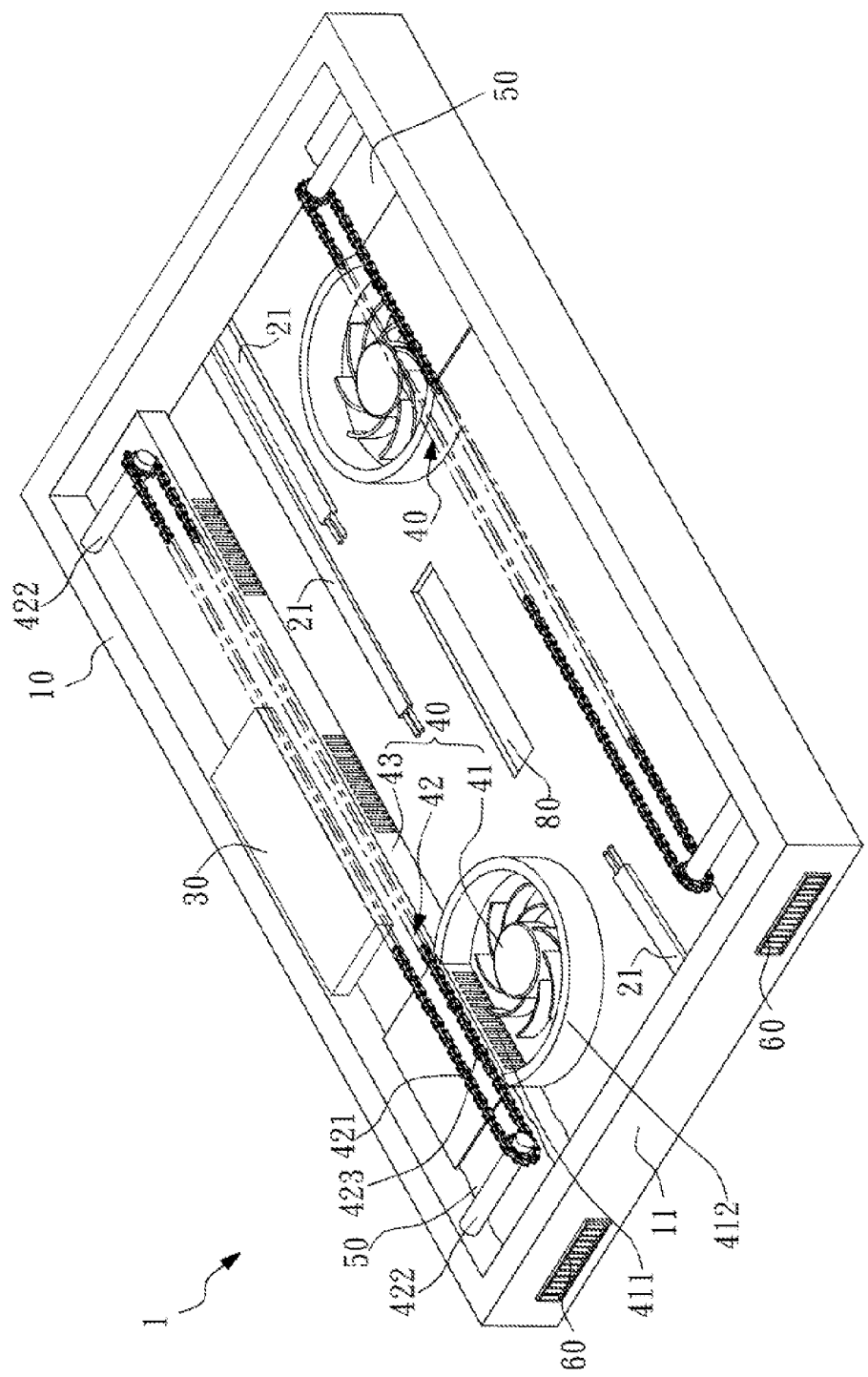
FIG. 1 illustrates a bottom view of a first embodiment of a heat dissipation system of the present invention.
Figure 2:
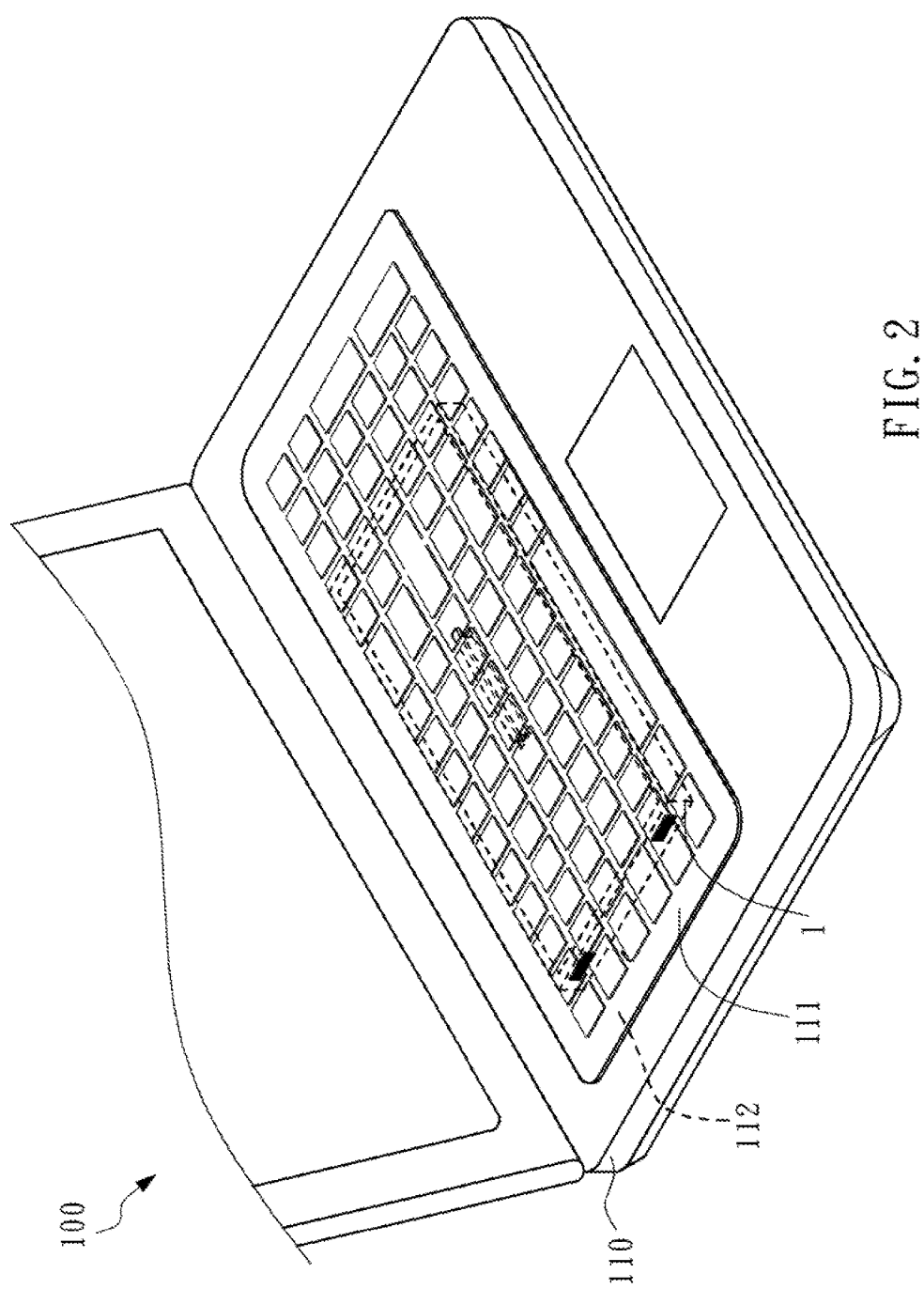
FIG. 2 illustrates a view of the first embodiment of the heat dissipation system of the present invention.

As shown in FIG. 1 and FIG. 2, a heat dissipation device 1 is disposed inside an electronic device 100 having heat dissipation requirements. In this embodiment, the electronic device 100 is a notebook PC which includes a circuit board 111 and a keyboard module 112 and has the heat dissipation device 1 disposed between the circuit board 111 and the keyboard module 112. However, the heat dissipation device 1 can be disposed anywhere near the circuit board 111, it doesn't need to be placed between the circuit board 111 and the keyboard module 112.

As shown in FIG. 1, in this embodiment, the heat dissipation system 1 comprises a heat dissipation body 10, three first thermal sensors 21, a control unit 30, two movable fan 40, two cooling ducts 50, and four outlets 60. The heat dissipation body 10 comprises a rectangular frame which can hold the elements described above. The three first thermal sensors 21 are distributed in various areas of the heat dissipation body 10 and used for monitoring working temperatures of areas around the three first thermal sensors 21. The control unit 30 is electrically coupled with each first thermal sensor 21 and the two movable fans 40, in this embodiment, the control unit 30 is a microcontroller for controlling the operations of each element inside the heat dissipation system 1.

As shown in FIG. 1, the two movable fans 40 are disposed in the heat dissipation body 10 and are controlled by the control unit 30 based on the working temperatures measured by the three first thermal sensors 21 to move horizontally along the major axis of the heat dissipation body 10 to the area of the first thermal sensor 21 which has measured a higher working temperature. The cooling ducts 50 are in communication with the two movable fans 40 respectively, also in this embodiment, each one of the two cooling ducts 50 is disposed with an outlet 60 at the end of the major axis of the heat dissipation body 10. When the two movable fans 40 are in operation, the heat generated inside the electronic device 100 can be discharged through air vents 411 of the two movable fans 40 to the outlets 60. In this design, the movable fan 40 can move to an area of the electronic device 100 having a high working temperature to enhance heat dissipation efficiency. Meanwhile, since the heat dissipation system 1 is disposed near the circuit board 111, the movable fan 40 is substantially closer to heat generating elements of the circuit board 111, thereby improving the heat dissipation efficiency of the electronic device 100.

Please refer to FIG. 1 and also refer FIG. 3 to FIG. 6 for views of the first and second embodiment of a moving element of the heat dissipation system.

As shown in FIG. 1, in this embodiment, the movable fan 40 comprises a fan main body 41, a moving element 42, and a moving member 43, wherein the fan main body 41 is a runoff fan connected with the heat dissipation body 10 through the moving element 42, the fan main body 41 is driven by the moving element 42 to move with respect to the heat dissipation body 10. In this embodiment, as shown in FIG. 3 and FIG. 4, the moving element 42 comprises a chain 421, two drive devices 422, and a fastening element 423, wherein the fan main body 41 is connected with the chain 421 through the fastening element 423, the two drive devices 422 can be electrically coupled with the control unit 30. In this embodiment, the drive device 422 is a cylindrical shaft, which is rotably engaged with the chain 421 to drive the chain 421 to move as the drive device 422 rotates, thereby driving the fan main body 41 to move horizontally with respect to the heat dissipation body 10 to an area having a higher working temperature. It is noted that, in this embodiment, when the fan main body 41 moves horizontally with respect to the heat dissipation body 10, it means that the fan main body 41 moves back and forth along the major axis of the heat dissipation body 10. In this embodiment, the fastening element 423 is a set of screw and nut; however, the fastening element 423 can be a set of protruding column and receiving hole, or any other suitable fastening means.

As shown in FIG. 1, FIG. 3 and FIG. 4, in this embodiment, the moving member 43 can be an expansion pipe or any element made of elastic materials; the moving member 43 is connected with the fan case 412, when the chain 421 drives the fan main body 41 to move, the moving member 43 is pushed by the fan main body 41 to expand or shrink to the right or left. Therefore, when the fan main body 41 moves to a predestined point (where the measured working temperature is higher than others'), the fan main body 41 can discharge the heat generated inside the electronic device 100 through the air vent 411 and the cooling duct 50 to the outlet 60.

Figure 5:
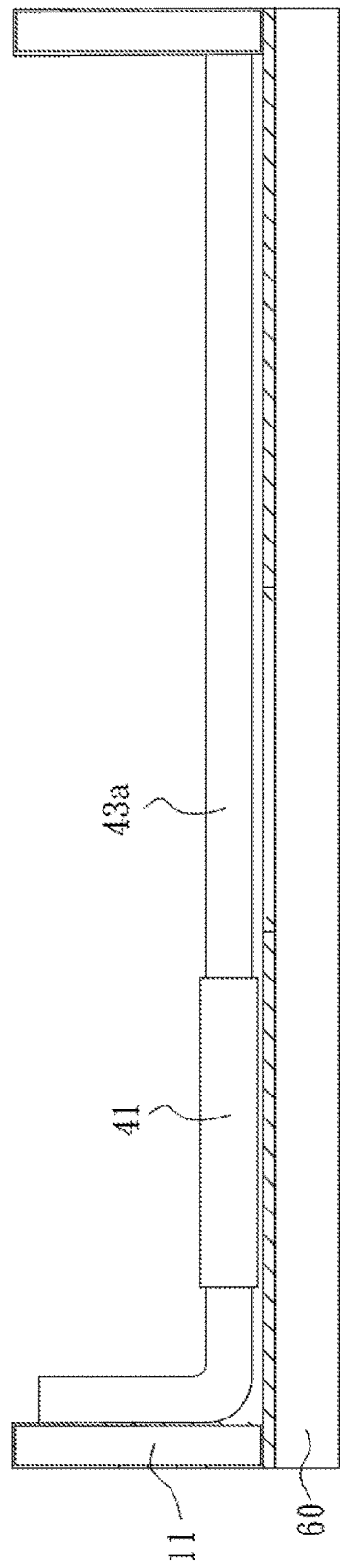
FIG. 5 illustrates a view of a second embodiment of the moving element of the heat dissipation system of the present invention.
Figure 6:
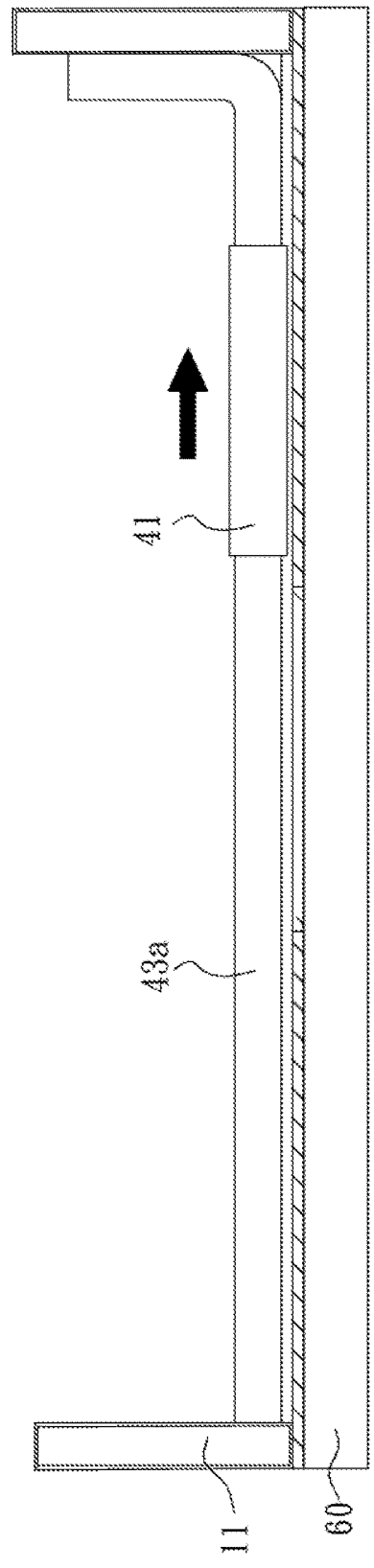
FIG. 6 illustrates a second view of the second embodiment of the moving element of the heat dissipation system of the present invention.

It is noted that the moving member 43 is not limited to expansion pipe or elastic elements. As shown in FIG. 5 and FIG. 6, in the second embodiment of the moving member 43, the moving member 43a is a sliding sheet, when the chain 421 drives the fan main body 41 to move, the moving member 43a is pushed by the fan main body 41 to move to the left or the right, and the excess part of the sliding sheet would extend on the inner sidewall of minor axis 11 of the heat dissipation body 10.

Please refer to FIG. 7 to FIG. 10 for the bottom view, top view, operational view of the second embodiment of the heat dissipation system and the view of the second embodiment of the electronic device of the present invention.

Figure 7:
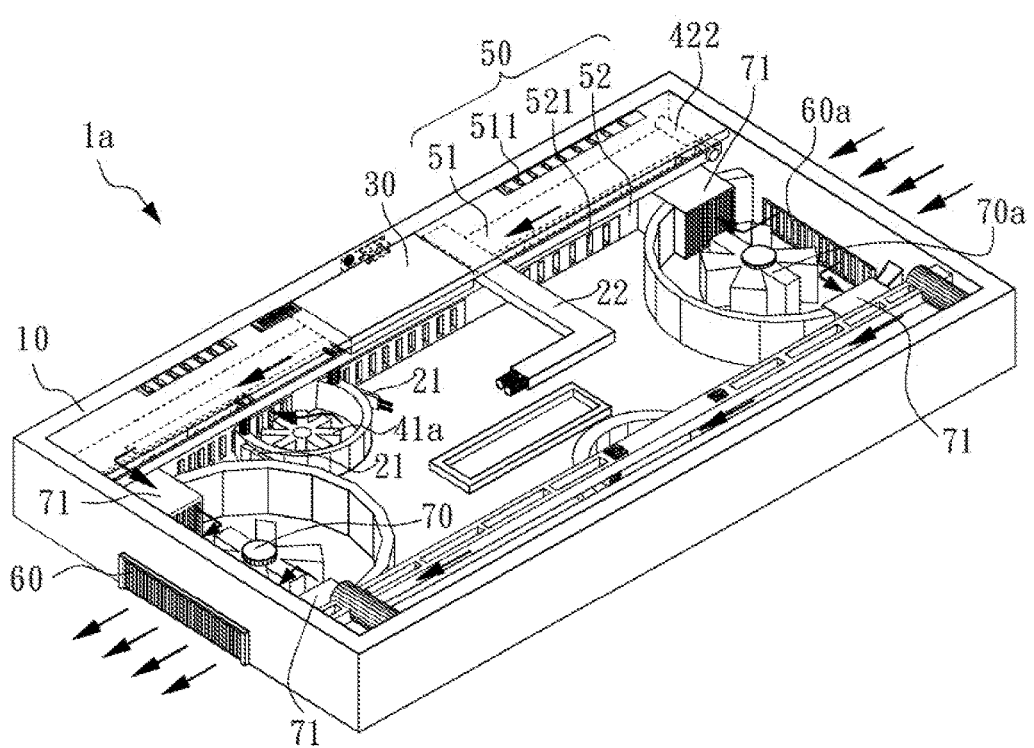
FIG. 7 illustrates a bottom view of the second embodiment of the heat dissipation system of the present invention.
Figure 8:
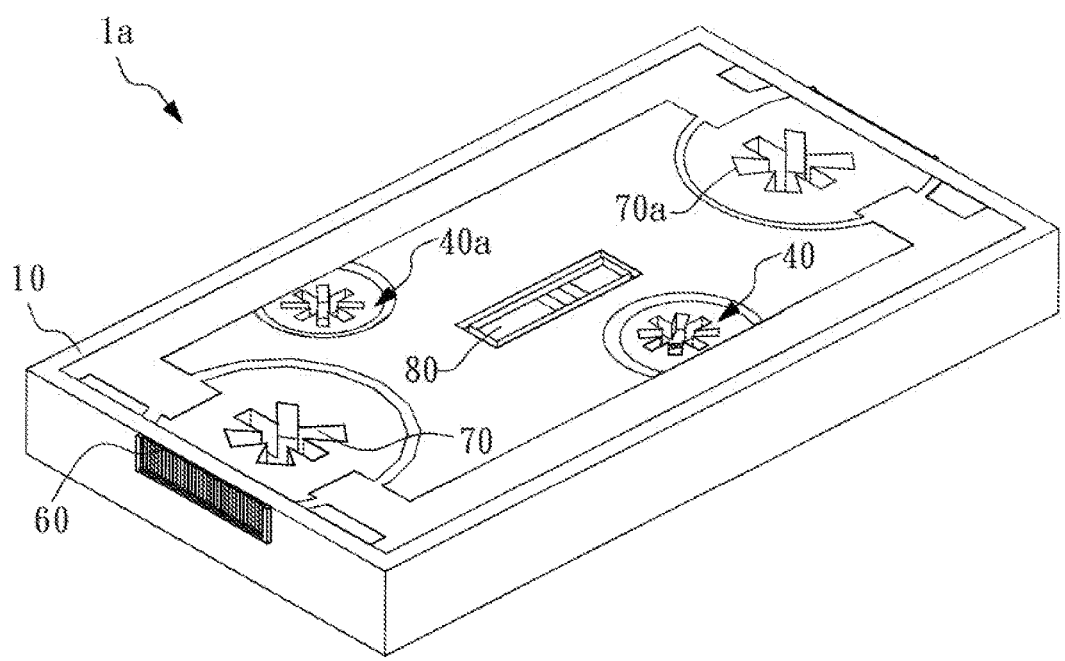
FIG. 8 illustrates a top view of the second embodiment of the heat dissipation system of the present invention.

As shown in FIG. 7 and FIG. 8, the heat dissipation system 1a comprises a heat dissipation body 10, four first thermal sensors 21, a second thermal sensor 22, a control unit 30, two movable fans 40, two cooling ducts 50, two outlets 60, 60a and two fixed fans 70, 70a, wherein the four first thermal sensors 21 are disposed at opposing sides of the two movable fans 40 respectively. The major difference between the heat dissipation system 1a and the heat dissipation system 1 is that the cooling duct 50 of the heat dissipation system 1a comprises a vertical wind tunnel 51 and a horizontal wind tunnel 52, wherein the vertical wind tunnel 51 includes a vertical outlet 511 disposed near the circuit board 111; the horizontal wind tunnel 52 includes a horizontal outlet 521 disposed away from the circuit board 111. In addition, the movable fan 40 is disposed near the horizontal wind tunnel 52. It is noted that the vertical wind tunnel 51 and the horizontal wind tunnel 52 are two independent wind tunnels and are not connected with each other.

As shown in FIG. 7, the fixed fans 70, 70a are disposed between the cooling duct 50 and the outlet 60, the fixed fans 70, 70a are disposed so as to allow the cooling duct 50 to be in communication with the outlet 60. The second thermal sensor 22 is electrically coupled with the control unit 30 and disposed between the two fixed fans 70. The second thermal sensor 22 is used for detecting a working temperature of the electronic device 100, thereby allowing the control unit to determine which one of the two fixed fans 70, 70a should introduce external air into the electronic device, and which one of the two fixed fans 70, 70a should discharge the air inside the electronic device 100 to the outside. In another embodiment of the present invention, the two fixed fans 70, 70a can both discharge the hot air or introduce the cold air at the same time.

In this embodiment, each one of the fixed fans 70, 70a includes two air vents 71 disposed at opposing sides of the fan and being in communication with different cooling ducts 50, wherein one air vent 71 (the air vent of the left fan in FIG. 9) is in communication with the horizontal wind tunnel 52, and another air vent 71 (the air vent of the right fan in FIG. 9) is in communication with the vertical wind tunnel 51, thereby forming a air current loop consisted of two fixed fans 70, two cooling ducts 50, and two outlets 60, 60a and discharging the hot air inside the electronic device 100 to the outside and introducing colder air from the outside.

Figure 9:
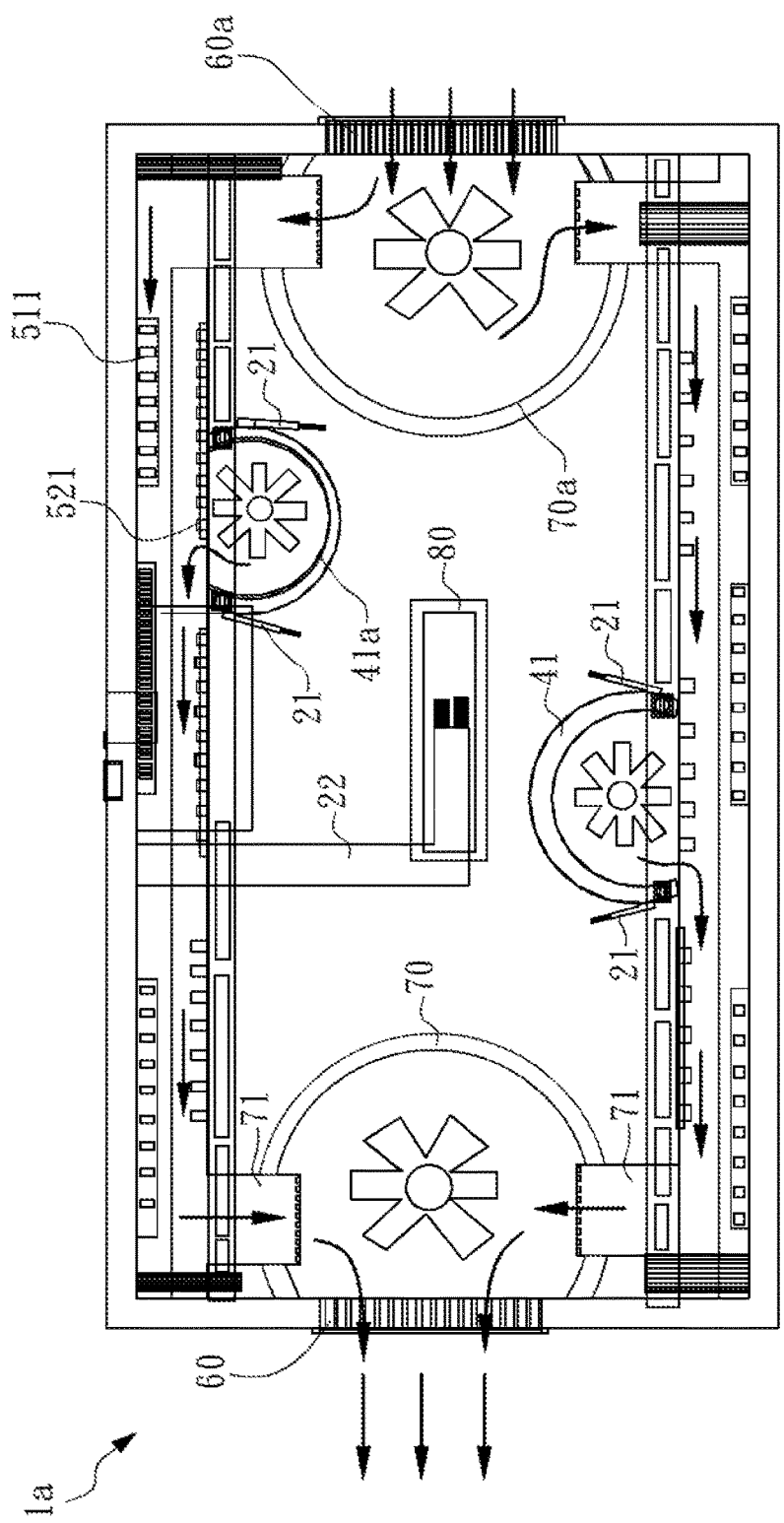
FIG. 9 illustrates an operational view of the second embodiment of the heat dissipation system of the present invention.

According to a preferred embodiment of the present invention, as shown in FIG. 7 and FIG. 9, when the heat source in the electronic device is dissipating heat, the fixed fan 70a operates to introduce the external air through the outlet 60a and the air vent 71 to the vertical wind tunnel 51. Since the external air is colder than the inner air inside the heat dissipation body 10, the external air would descend through the vertical outlet 511 to the open space of the heat dissipation body 10 and push the hot air in the heat dissipation body 10 to ascend. The hot/cold air convection can be enhanced with the assistance of the fan main body 41a. Therefore, the hot air would flow from the horizontal outlet 521 to the horizontal wind tunnel 52, then the hot air is discharged by another fixed fan 70 through the outlet 60 to the outside, thereby completing the air current loop. The movable fan 40 in the heat dissipation body 10 can move to a position to be in communication with the horizontal wind tunnel 52 and help accelerate the discharging process of hot air in the horizontal wind tunnel. It is noted that, in this embodiment, the fan main bodies 41, 41a are substantially the same as those described in the first embodiment and will not be further discussed. Additionally, the control unit 30 controls the movements of the fan main bodies 41, 41a based on the measured temperatures provided by the first thermal sensors 21.

Figure 10:
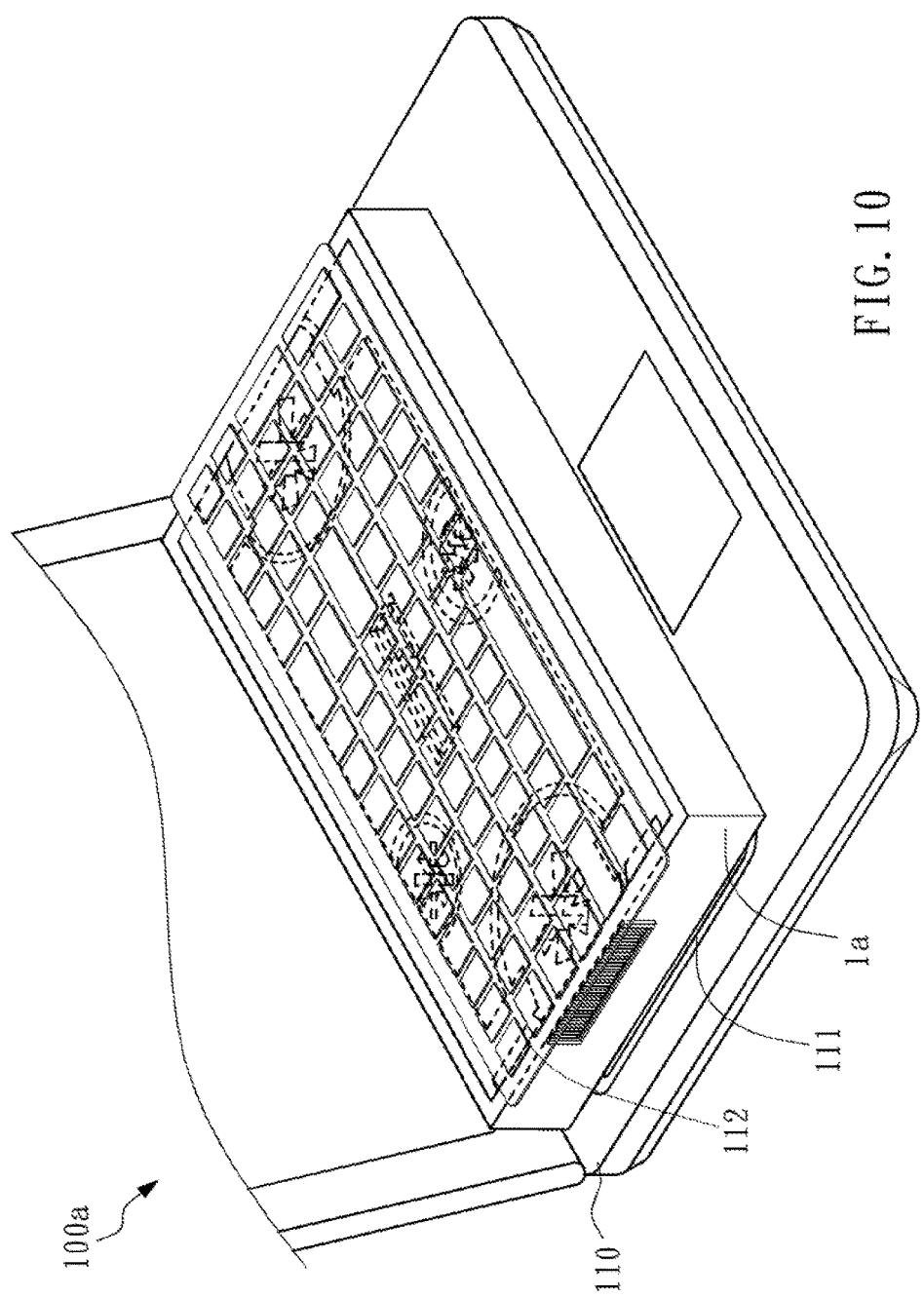
FIG. 10 illustrates a view of the second embodiment of the heat dissipation system of the present invention.

As shown FIG. 10, the keyboard module 112 of the electronic device 100a is a removable keyboard, the heat dissipation system 1a is an external heat dissipation system of the electronic device 100a. Before using the external heat dissipation system, remove the keyboard module 112 and then place the heat dissipation system 1a between the keyboard module 112 and the circuit board 111, connect the heat dissipation system 1a to the USB port of the electronic device 100a through a USB connector to supply power to the heat dissipation system 1a. Since USB is well known in the art, it will not be further described. Besides, the heat dissipation system 1 can also be external heat dissipation system.

Figure 11:
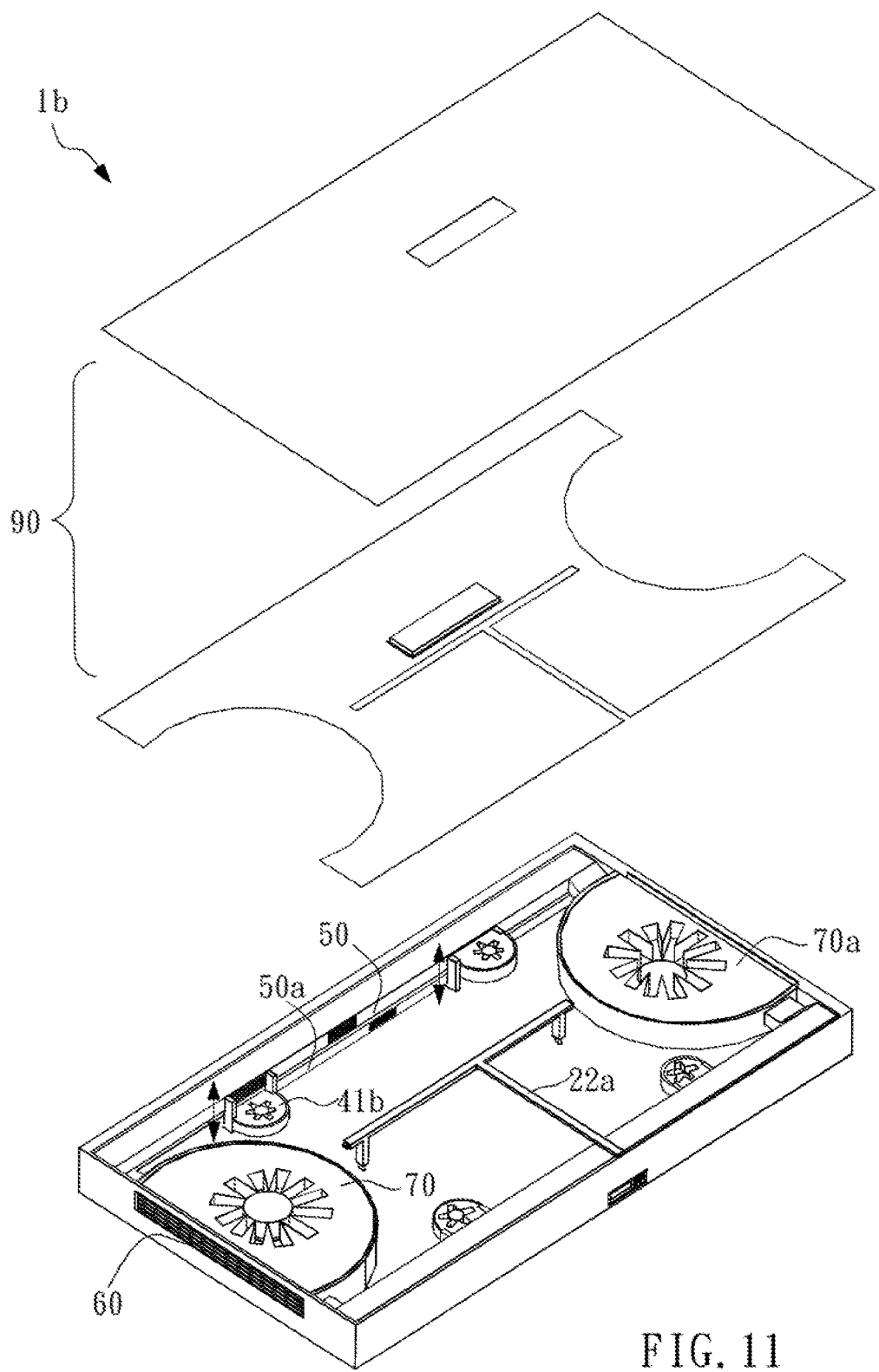
FIG. 11 illustrates a view of a third embodiment of the heat dissipation system of the present invention.
Figure 12:
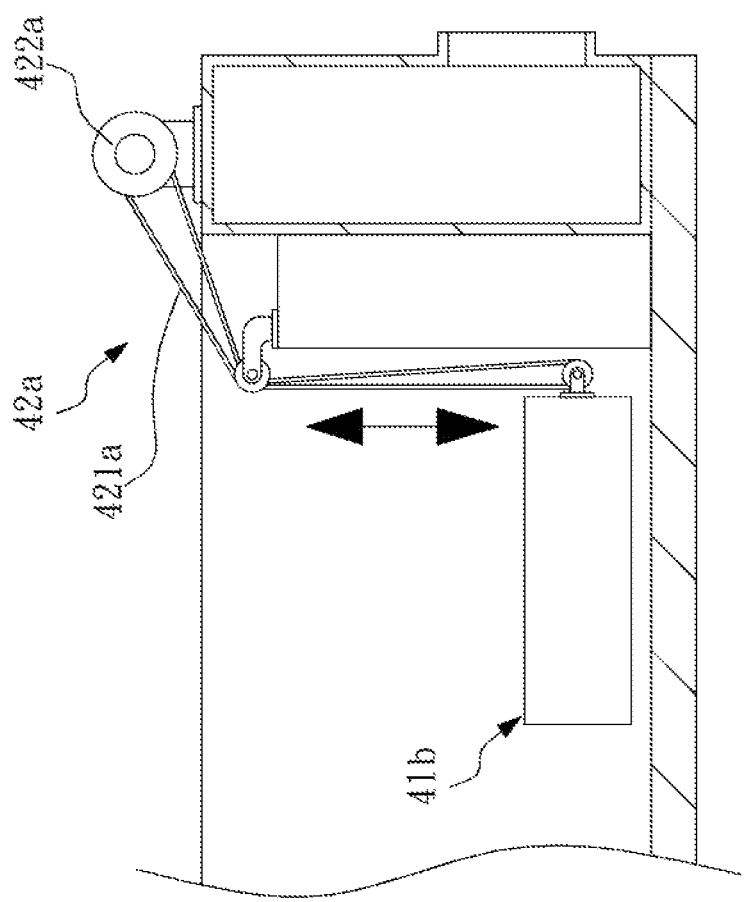
FIG. 12 illustrates a view of the third embodiment of the moving element of the heat dissipation system of the present invention.

Please refer FIG. 11 to FIG. 13 for the third embodiment of the heat dissipation system, and also the third and fourth embodiment of the moving element of the present invention.

As shown in FIG. 11, the major difference between the heat dissipation system 1b of the third embodiment and the heat dissipation system of previous embodiments is that the fan main body 41b can move vertically, and the heat dissipation system 1b comprises two cooling ducts 50, 50a placed in a stack, wherein the fan main body 41b is movably in communication with the two cooling ducts 50, 50a to discharge the heat generated inside the electronic device through one of the cooling ducts 50, 50a to the outlet 60.

As shown in FIG. 11 and FIG. 12, in order to allow the fan main body 41b to move vertically with respect to the cooling ducts 50, 50a, the moving element 42a is a reel-type element with a form resembling a rolling door. When the drive device 422a pulls the chain 421a, the fan main body 41b can move vertically with respect to the cooling ducts 50, 50a. It is noted that the present invention is not limited to the reel-type moving element 422a and the chain 421a. As shown in FIG. 13, the moving element 42b can be an electromagnetic device, wherein the moving element 42b comprises a magnetic member 424 and a drive device 422b, the drive device 422b is an electromagnet. The fan main body 41c is connected with the magnetic member 424, the electromagnet 422b generates a magnetic force to move the magnetic member 424, which in turn drives the fan main body 41c to move vertically with respect to the heat dissipation body. It is noted that although the moving elements 42a, 42b are used for vertically lifting the fan main bodies 41b, 41c, the moving elements 42a, 42b can also be used for moving the fan main bodies 41b, 41c horizontally. Besides, the reel-type moving element 42a for pulling the chain 421a, and also the electromagnet are well known in the art and will not be further discussed.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A heat dissipation system used in an electronic device, wherein the electronic device comprises a device main body including a circuit board, the heat dissipation system comprising:
   a heat dissipation body disposed near the circuit board;
   a plurality of first thermal sensors being distributed in various areas of the heat dissipation body and used for monitoring a working temperature of each area;
   a control unit electrically coupled with each one of the plurality of first thermal sensors;
   at least one movable fan movably disposed on the heat dissipation body and electrically coupled with the control unit, thereby allowing the control unit to control the at least one movable fan to move to an area of the heat dissipation body having a higher working temperature than those of the other areas; and
   at least one cooling duct, comprising a vertical wind tunnel and a horizontal wind tunnel, the vertical wind tunnel includes a vertical outlet disposed near the circuit board, the horizontal wind tunnel includes a horizontal outlet disposed away from the circuit board.

2. The heat dissipation system as claimed in claim 1, wherein the at least one movable fan comprises a fan main body and a moving element, the fan main body is connected with the heat dissipation body and moves with respect to the heat dissipation body through the moving element.

3. The heat dissipation system as claimed in claim 2, wherein the moving element comprises a chain and a drive device, the drive device drives the chain to move, and the fan main body connected with the chain, then the chain drives the fan main body to move vertically or horizontally with respect to the heat dissipation body.

4. The heat dissipation system as claimed in claim 1, wherein the heat dissipation system comprises at least one outlet, the at least one cooling duct is in communication with the at least one movable fan so as to discharge the heat generated by a heat generating element inside the electronic device through the at least one cooling duct to the at least one outlet.

5. The heat dissipation system as claimed in claim 4, wherein the heat dissipation system further comprises at least one fixed fan, the at least one fixed fan is in communication with the at least one cooling duct and the at least one outlet respectively so as to discharge the heat generated by the heat generating element inside the electronic device through the at least one cooling duct to the at least one outlet.

6. The heat dissipation system as claimed in claim 1, wherein the at least one movable fan is disposed near the horizontal wind tunnel.

7. The heat dissipation system as claimed in claim 1, wherein the at least one cooling duct and the at least one fixed fan are plural, each one of the plurality of fixed fans is in communication with the vertical wind tunnel and the horizontal wind tunnel of each one of at least one cooling duct at opposing sides of each one of the plurality of fixed fans respectively.

8. The heat dissipation system as claimed in claim 7, wherein the heat dissipation system comprises a second thermal sensor disposed among the plurality of fixed fans and electrically coupled with the control unit so as to activate the plurality of fixed fans.

9. The heat dissipation system as claimed in claim 2, wherein the moving element comprises a magnetic member and a drive device, the drive device is a electromagnet and the fan main body is connected with the magnetic member, the electromagnet generates a magnetic force to move the magnetic member, which in turn drives the fan main body to move horizontally or vertically with respect to the heat dissipation body.

10. The heat dissipation system as claimed in claim 3, wherein the heat dissipation system comprises two cooling ducts and at least one outlet, the at least one movable fan is movably in communication with the two cooling ducts to discharge the heat generated inside the electronic device through one of the two cooling ducts to the at least one outlet.

11. The heat dissipation system as claimed in claim 1, wherein the plurality of first thermal sensor is disposed at opposing sides of the at least one movable fan.

12. An electronic device comprising:
a device main body including a circuit board;
a heat dissipation system comprising:
a heat dissipation body disposed near the circuit board;
a plurality of first thermal sensors being distributed in various areas of the heat dissipation body and used for monitoring a working temperature of each area;
a control unit electrically coupled with each one of the plurality of first thermal sensors;
at least one movable fan movably disposed on the heat dissipation body and electrically coupled with the control unit, thereby allowing the control unit to control the at least one movable fan to move to an area of the heat dissipation body having a higher working temperature than those of the other areas; and
at least one cooling duct, comprising a vertical wind tunnel and a horizontal wind tunnel, the vertical wind tunnel includes a vertical outlet disposed near the circuit board, the horizontal wind tunnel includes a horizontal outlet disposed away from the circuit board.

13. The electronic device as claimed in claim 12, wherein the at least one movable fan comprises a fan main body and a moving element, the fan main body is connected with the heat dissipation body and moves with respect to the heat dissipation body through the moving element.

14. The electronic device as claimed in claim 13, wherein the moving element comprises a chain and a drive device, the drive device drives the chain to move, and the fan main body connected with the chain, then the chain drives the fan main body to move vertically or horizontally with respect to the heat dissipation body.

15. The electronic device as claimed in claim 12, wherein the heat dissipation system comprises at least one outlet, the at least one cooling duct is in communication with the at least one movable fan so as to discharge the heat generated by a heat generating element inside the electronic device through the at least one cooling duct to the at least one outlet.

16. The electronic device as claimed in claim 15, wherein the heat dissipation system further comprises at least one fixed fan, the at least one fixed fan is in communication with the at least one cooling duct and the at least one outlet respectively so as to discharge the heat generated by the heat generating element inside the electronic device through the at least one cooling duct to the at least one outlet.

17. The electronic device as claimed in claim 12, wherein the at least one movable fan is disposed near the horizontal wind tunnel.

18. The electronic device as claimed in claim 12, wherein the at least one cooling duct and the at least one fixed fan are plural, each one of the plurality of fixed fans is in communication with the vertical wind tunnel and the horizontal wind tunnel of each one of at least one cooling duct at opposing sides of each one of the plurality of fixed fans respectively.

19. The electronic device as claimed in claim 18, wherein the heat dissipation system comprises a second thermal sensor disposed among the plurality of fixed fans and electrically coupled with the control unit so as to activate the plurality of fixed fans.

20. The electronic device as claimed in claim 12, wherein the plurality of first thermal sensor is disposed at opposing sides of the at least one movable fan.

21. The electronic device as claimed in claim 13, wherein the moving element comprises a magnetic member and a drive device, the drive device is a electromagnet and the fan main body is connected with the magnetic member, the electromagnet generates a magnetic force to move the magnetic member, which in turn drives the fan main body to move horizontally or vertically with respect to the heat dissipation body.

22. The electronic device as claimed in claim 14, wherein the heat dissipation system comprises two cooling ducts and at least one outlet, the at least one movable fan is movably in communication with the two cooling ducts to discharge the heat generated inside the electronic device through one of the two cooling ducts to the at least one outlet.

* * * * *